United States Patent [19] [11] Patent Number: 5,203,575
Azibert et al. [45] Date of Patent: Apr. 20, 1993

| | | |
|---|---|---|
| 4,290,611 | 9/1981 | Sedy ........................ 277/27 |
| 4,377,290 | 3/1983 | Netzel ..................... 277/38 |
| 4,466,619 | 8/1984 | Adams ..................... 277/15 |
| 4,538,821 | 9/1985 | Wallace ................... 277/81 R |
| 4,560,173 | 12/1985 | Adams et al. ........... 277/75 |
| 4,606,712 | 8/1986 | Vondra ................... 418/88 |
| 4,639,000 | 1/1987 | Warner ................... 277/41 |
| 4,721,311 | 1/1988 | Kakabaker .............. 277/22 |
| 4,737,087 | 4/1988 | Hertell ................... 418/1 |
| 4,889,348 | 12/1989 | Amundson et al. ... 277/65 X |

[54] BALANCED MECHANICAL SEAL ASSEMBLY AND FLOW RING THEREFOR

[75] Inventors: Henri V. Azibert, Windham; Margaret B. Willbrant, Derry, both of N.H.; Ann T. Attenasio, Revere, Mass.

[73] Assignee: AWChesterton Company, Stoneham, Mass.

[21] Appl. No.: 779,104

[22] Filed: Oct. 18, 1991

Related U.S. Application Data

[63] Continuation-in-part of Ser. No. 619,207, Nov. 28, 1990.

[51] Int. Cl.⁵ ............................... F16J 15/34
[52] U.S. Cl. ............................ 277/59; 277/65; 277/74; 277/75; 277/83; 277/81 R
[58] Field of Search .................... 277/3, 27, 59, 65, 63, 277/85, 87, 91, 81 R, 15, 93 SD, 93 R, 73, 74, 75, 83, 79, 38, 39, 40, 41

[56] References Cited

U.S. PATENT DOCUMENTS

| | | |
|---|---|---|
| 2,226,001 | 12/1940 | La Bour . |
| 2,577,858 | 12/1951 | Sampson .................. 277/79 X |
| 3,057,646 | 10/1962 | Brumagim ............... 285/41 |
| 3,261,611 | 7/1966 | Maidment ............... 277/34 |
| 3,315,968 | 4/1967 | Hanlon .................... 277/27 X |
| 3,588,124 | 6/1971 | Guinard ................... 277/3 |
| 3,591,188 | 7/1971 | Eisner ....................... 277/9 |
| 3,968,969 | 7/1976 | Mayer et al. ............ 277/15 |

FOREIGN PATENT DOCUMENTS

9114118 8/1991 PCT Int'l Appl. .
2123098A 1/1984 United Kingdom .

Primary Examiner—William A. Cuchlinski, Jr.
Assistant Examiner—Scott W. Cummings
Attorney, Agent, or Firm—Lahive & Cockfield

[57] ABSTRACT

An axially floating annular flow ring is provided for use in a gland mounted to rotary equipment concentrically to the equipment shaft. The ring has an outer circumferential surface for mounting to the gland interior adjacent to gland port mouths opening out of the gland interior surface and axially between the ends of primary seal members associated with the gland. The ring non-rotatably mates with the primary seal members and the gland, and can shift axially. The ring supplies a fluid flow channel in conjunction with fluid-flow vanes associated with the shaft and which ring can travel axially with the vanes to accommodate shaft endplay.

25 Claims, 8 Drawing Sheets

BALANCED MECHANICAL SEAL ASSEMBLY AND FLOW RING THEREFOR

This application is a continuation-in-part of co-pending U.S. application Ser. No. 07/619,207, filed Nov. 28, 1990, assigned to a common assignee.

FIELD OF THE INVENTION

This invention relates to mechanical seals, balanced mechanical seals, and a flow ring for acceleration of barrier fluid within the seal.

BACKGROUND OF THE INVENTION

Mechanical seals utilize relatively rotating and contacting seal faces, i.e., mating seal faces of a stator ring fixed to a gland and of a rotor ring fixed to the shaft of a rotary equipment, to isolate and seal a pressurized liquid, i.e., the process fluid, along the equipment shaft. To cool the seals and to aid in preventing any passage of process fluid across the seal faces, a second pressurized liquid, i.e., a barrier fluid, is often introduced to the seals on the rear side of the seal faces opposite that in contact with the process fluid. Typically, vanes are formed on the rotating shaft to accelerate the barrier fluid flowing between the shaft and gland. Springs normally bias the seal faces together.

In balanced seal arrangements the pressurized fluids are also applied to piston areas defined on the rear sides of the seal members opposite the seal faces to aid in closing the seal faces. In general, it is desirable to have the piston area associated with the fluid having the higher pressure to be less than 100% and preferably about 70% of the contact area of the seal faces. This relationship minimizes heat generation from the frictional contact of the seal faces while maintaining a closing force on the seal faces sufficiently high to assure proper sealing. It is also desirable to minimize the contact area of the seal faces so as to minimize heat generation as the seal faces rotate relative to each other. Additionally, when a barrier fluid is employed, a double seal arrangement is often utilized in which the process fluid is confined to one end of the seal and the barrier fluid to the center of the seal with relatively rotating seal faces on either side of the barrier fluid, with the local environment being sealed at the other end of the seal.

In one type of balanced double seal in the prior art both fluids have access to the rear of the respective seal members opposite the seal faces and the desired balance ratio of the piston area to the seal face contact area is achieved by providing O-rings slidable in their O-ring grooves behind the respective seal faces of the seal members. The O-rings slide in the grooves to permit application of fluid pressure from the fluid having the highest pressure to the appropriate piston areas on the sides of the seal members opposite the seal faces. Springs biasing the seal faces together are located within the seal on either side of the seal faces and may be exposed to either or both of the process and barrier fluids. This arrangement has significant limitations. First, since the inner and outer diameters of the O-rings define the balance pressure points for the respective fluids, the radial contact dimension of the seal faces must be sufficiently large to account for the thickness of the O-rings. This limits the design of the seal faces for which minimum contact area is desired. Second, if the O-rings do not slide as intended in their grooves, the balance pressures will not be achieved as intended. Additionally, the springs, exposed to the process and barrier fluids, are subject to contamination and corrosion.

It is therefore an object of the present invention to provide a mechanical seal assembly which overcomes the deficiencies of the prior art.

It is another object of the present invention to provide a balanced seal assembly where the balance pressures are not effected by O-ring movement.

It is another object of the present invention to provide a double balanced double seal assembly where the balance pressures are determined by fixed piston areas defined on rear surfaces of the mating primary seal rings.

It is yet another object of the present invention to provide a balanced seal assembly in which the primary seal members remain squared to each other and to the rotating shaft regardless of shaft runout or endplay.

It is a further object of the present invention to provide a seal assembly having a floating flow ring which optimizes acceleration and delivery of barrier fluid within the barrier fluid chamber of the seal assembly regardless of shaft anomalies.

SUMMARY OF THE INVENTION

These and other objects are met by the presently disclosed invention In one aspect of the invention, the seal assembly isolates the sealing process from any misalignment between the shaft of the equipment being sealed and the equipment itself, i.e., between the shaft and a plane perpendicular to the endface of the equipment stuffing box upon which the seal gland is mounted.

In a preferred embodiment, the seal assembly has relatively rotatable annular primary seal members for sealing and separating process and barrier fluids respectively on radially inner peripheries of the primary seal members, the seal members defining respective annular, radially extending, opposed seal faces therebetween contacting each other over a predetermined contact area. A shaft sleeve having a flange at one end is provided in this embodiment, and the seal members are mounted relative to the sleeve between a flange at one end of the sleeve and springs at the other end of the sleeve. A respective secondary seal contacts a respective one of the primary seal members on the rear sides thereof at positions spaced axially from and opposite the seal faces, at fixed diameters of the primary seal members, prevent passage of fluid axially along the seal members.

The above primary seal members form a first and second pair of primary seal members and the associated secondary seals form a first and second pair of secondary seals, and form inboard and outboard seals with a sealed barrier fluid chamber thereinbetween.

A gland is mounted on the equipment nominally concentrically to the shaft and two stationary ones of the primary seal members are resiliently and slideably mounted thereto. The other two primary seal members are mounted on the sleeve for rotation with the shaft, the outboard one of which being slideably mounted and the inboard one being in abutment with the sleeve flange. With the springs biasing the primary seal members together and into the flange, the primary seal members remain aligned relative to the flange without regard to shaft endplay and runout.

In another aspect of the invention, a double balanced double seal is disclosed in which a fixed and predefined piston area is defined on the rear side of each primary seal member without regard to secondary seal location or thickness.

In a preferred embodiment, the piston areas are axially aligned (i.e., coaxial) with and smaller than the contact area of the seal faces. Each such piston area forms a predetermined area preferably equal to a major portion of the contact area. One of the piston areas extends radially inwardly in fluid communication with the inner periphery of the primary seal members and the other of the piston areas extends radially outwardly in fluid communication with the outer periphery of the seal members. The axially outer one of the piston areas serves as a piston area for the barrier fluid and the other axially inner one of the piston areas serves as a piston area for the process fluid.

In various embodiments, the contact areas of the first and second pairs of seal faces are equal. One axially inner seal member of the first pair of primary seal members is positioned at the opposite end of the seal assembly from the one axially outer seal member of the second pair of seal members, each having its rear side facing away from the others of the first and second primary seal members, with the piston area thereof extending radially inwardly and communicating with the inner periphery of all of the primary seal members, the piston areas of these one seal members of the first and second pairs of primary seal members being equal. Preferably the radially inner periphery of each of the primary seal members is in communication with the barrier fluid.

Advantageously, a seal assembly according to the present invention seals an equipment shaft without regard to misalignment between the shaft and equipment, and achieves pressure balance by virtue of the geometry of the parts, providing fixed, predetermined piston areas on the sides of the primary seal members opposite the seal faces without reliance on any movable parts (such as O-rings) which may be subject to wear or malfunction. An individual piston area is exposed to only one of the fluids. Further, the contact area of the seal faces may be optimized without any limitation imposed by the size of the O-rings defining the balance pressure points. According to another feature of the invention, the springs biasing the seal faces are positioned at one end of the seal assembly and are not exposed to either process or barrier fluids. Advantageously, these springs can be observed as a measure of seal face wear. Additionally, the spring load is generally unaffected by misalignment of the seal assembly and equipment shaft on which the seal assembly is mounted. Advantageously, as well, pressure balance of the seal faces is achieved in both directions with no relative motion of the seal assembly parts required to achieve the balance. Furthermore, because the invention makes possible design of seal faces having small contact area, heat generation in operation of the seal assembly is minimized.

In yet another aspect of the invention, these features and advantages are further exploited in an arrangement for optimizing delivery of the barrier fluid to the parts to be contacted therewith, in which the facing rear ends of the non-rotatable stationary primary seal members abut a respective axial side of an axially floating, anti-rotation providing, annular flow ring mounted concentrically to the shaft. The ring is generally annular and defines an internal flow path or flow channel by having an interior circumferential floor portion at a first inner diameter bordered by sidewalls thereof which terminate at a smaller inner diameter only slightly greater than the local outer diameter of the shaft sleeve thereat.

Various embodiments of the shaft or sleeve include pump vanes for acceleration of the barrier fluid as the shaft rotates. Advantageously in this embodiment, the ring floats axially with travel of the non-rotatable stationary members. This floating maintains the flow channel centered over the pumping vanes so as to optimize delivery of the cooling barrier fluid to the axially shifted seal faces in the event of shaft endplay.

Fluid flow in one portion of the defined flow channel is obstructed by a dam formed on the ring interior. The ring further defines a pair of fluid ports, serving as a fluid inlet port or fluid outlet port according to the direction of shaft rotation. Each port extends radially through the ring circumference and terminates at the ring interior as the port opens into the defined flow channel. The unobstructed portion of the flow channel provides a barrier-fluid flow path from the inlet port to the outlet port in a desired fluid-flow direction, while the dam prevents fluid flow in the opposite direction.

The dam is formed by a pair of flanges which extend radially inwardly from a common origin on the outer circumference of the ring. Each flange defines a respective circumferential opening extending radially through the ring. The inlet and outlet ports are each respectively formed as a radial circumferential opening joining a respective one of the flange-defined radial circumferential openings. In operation, at the inlet port, the associated flange directs fluid flow inwardly between the rotating shaft and the unobstructed flow channel and at the outlet port the associated flange directs the accelerated fluid outwardly out of the flow channel.

The outer circumference of the flow ring includes anti-rotation bosses which engage the anti-rotation notches of the facing ends of the abovesaid non-rotatable members. An anti-rotation lug secures the ring to the seal gland. Thus the notched members and the flow ring are secured against rotation, and alignment of the inlet and outlet ports of the flow channel with respective mouths of radial inlet and outlet ports of the gland is thereby assured. The seal inlet and outlet ports couple with the ring inlet and outlet ports essentially tangentially to the shaft central axis. The inner diameter of each of the port mouths is greater than the inner diameter of the port associated therewith so that fluid flow is facilitated even with axial floating of the ring.

BRIEF DESCRIPTION OF THE DRAWING

These and other features and advantages of the present invention will be more fully understood by reference to the following detailed description in conjunction with the attached drawing in which like reference numerals refer to like elements and in which.

DETAILED DESCRIPTION OF PREFERRED EMBODIMENTS

Figure 1:
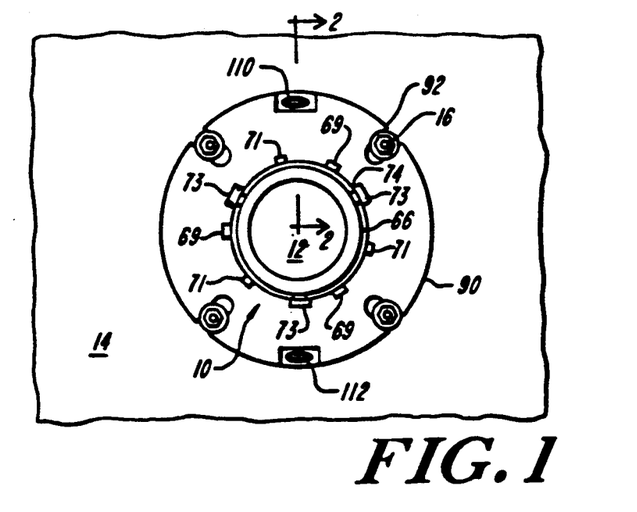
FIG. 1 is a front elevation view of a mechanical seal assembly of the invention.
Figure 2:
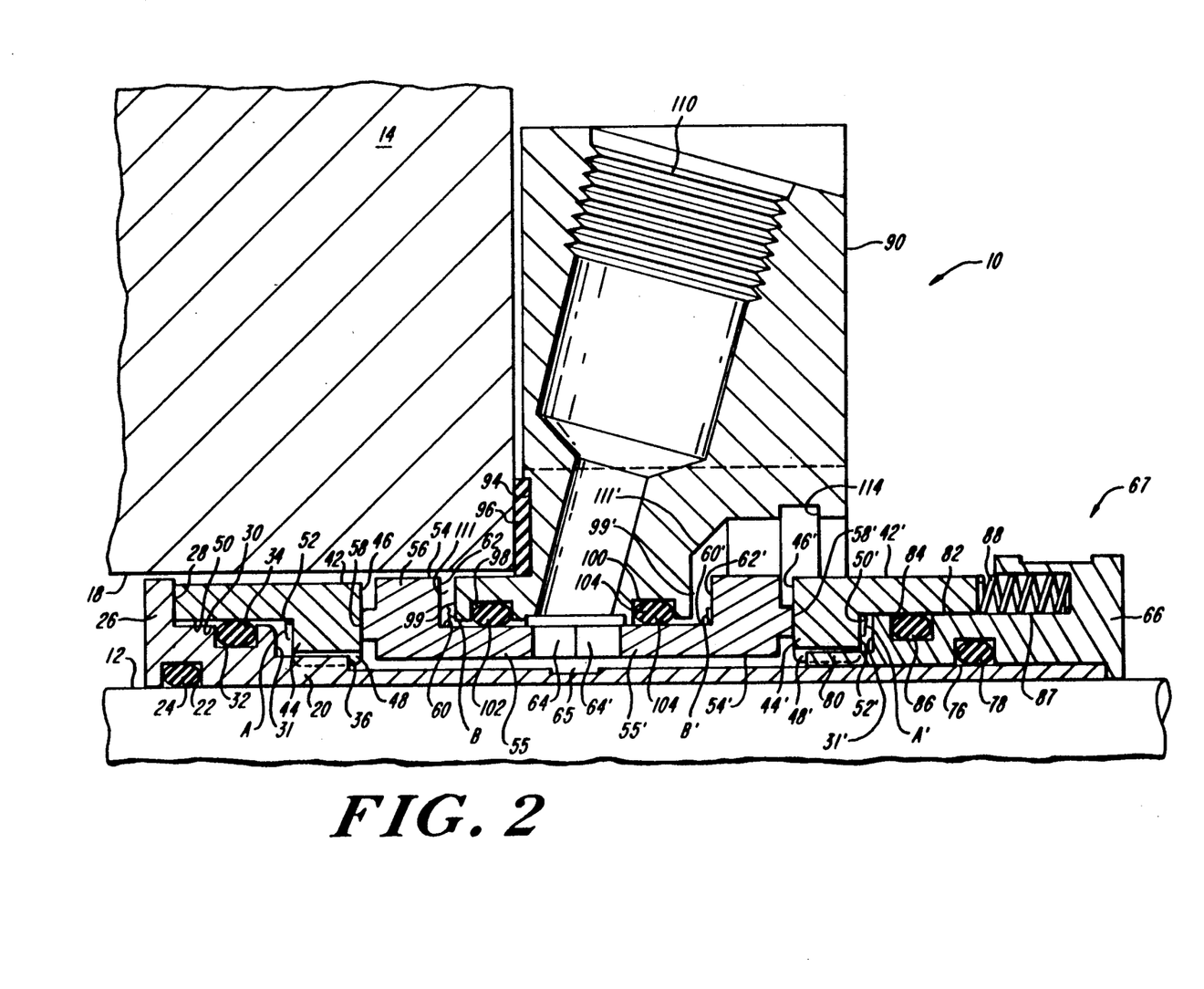
FIG. 2 is an enlarged sectional view of the invention of FIG. 1 taken at line 2—2.
Figure 2A:
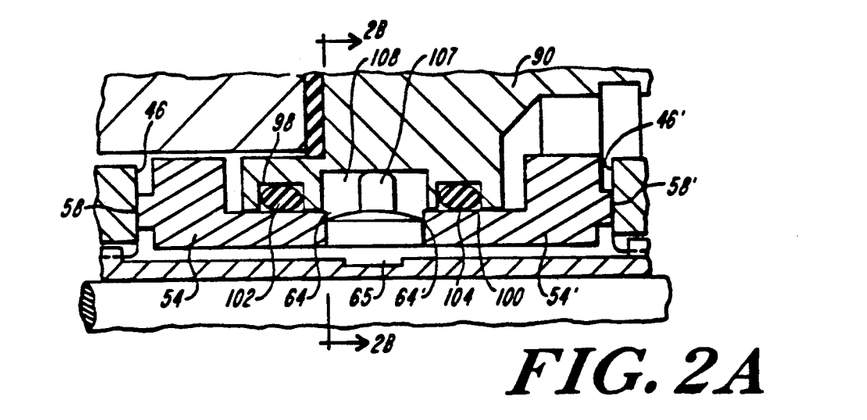
FIG. 2A is a fragmentary sectional view of the invention of FIG. 1 similar to FIG. 2, taken at a point rotated 90° from FIG. 2.
Figure 2B:
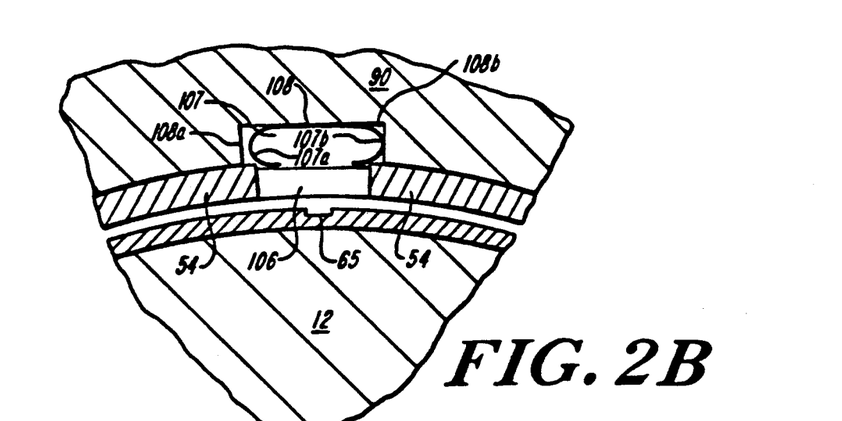
FIG. 2B is an enlarged sectional view of the invention of FIG. 1, taken at line 2B—2B of FIG. 2A.
Figure 3:
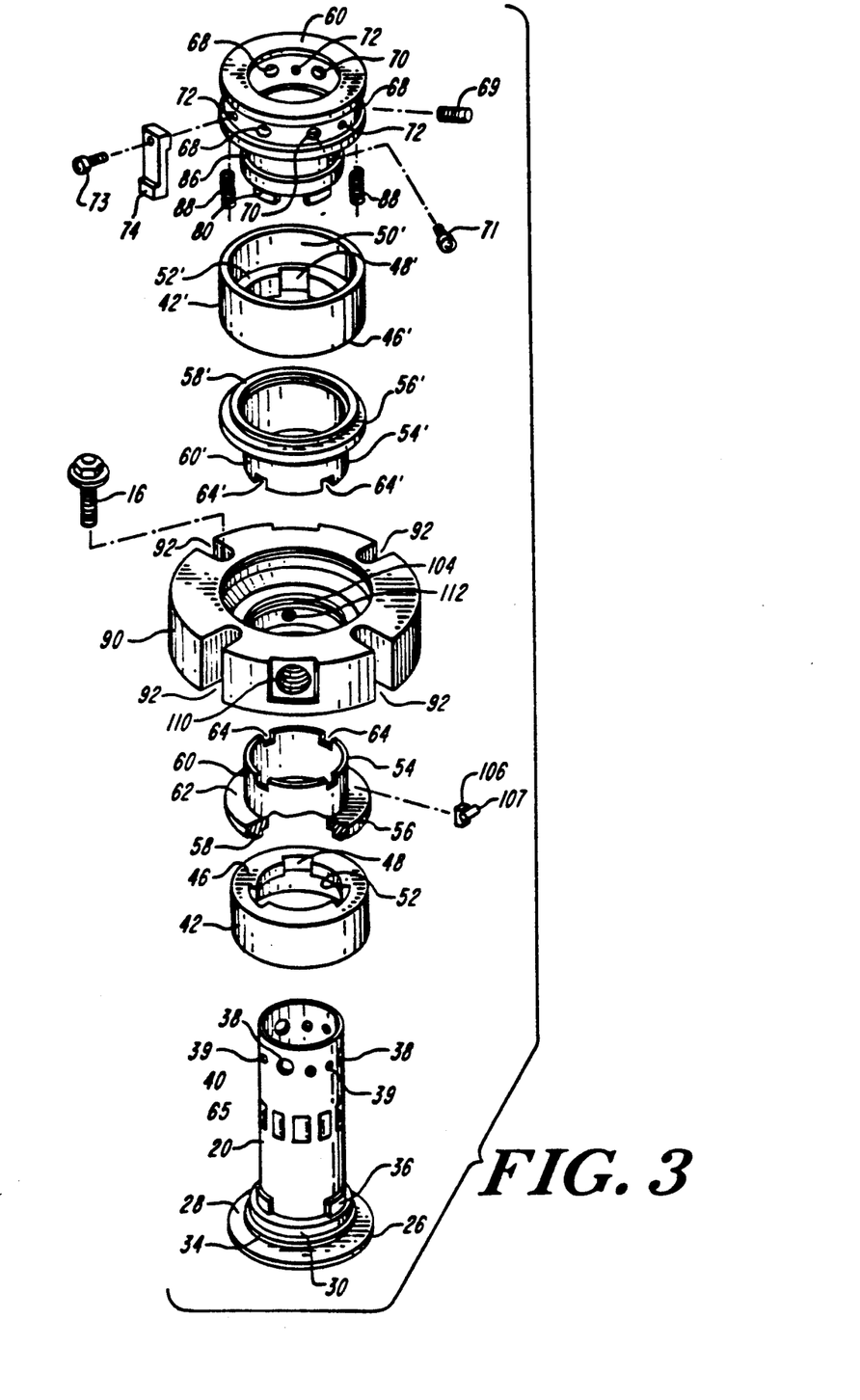
FIG. 3 is an exploded perspective view of the invention of FIG. 1.

Referring now to FIGS. 1-3, a mechanical seal assembly 10 according to the invention is mounted on a pump shaft 12 and is secured to the pump housing 14 by bolts 16. Seal assembly 10 extends partially into the stuffing box 18 of the pump housing.

The seal 10 includes a sleeve 20 adjacent shaft 12. At the inboard end of the sleeve 20, i.e., the end inserted into the stuffing box 18, a groove 22 on the inner periphery of sleeve 20 receives an O-ring 24 adjacent shaft 12 to prevent process fluid from passing from the pump between sleeve 20 and shaft 12. Sleeve 20 has a stepped construction at its inboard end and thus defining a flange 26, the flange having an outer diameter smaller than the inner diameter of the stuffing box 18 and having an outwardly facing wall 28 squared at right angles to the inner surface of sleeve 20 adjacent shaft 12. A step 30 is provided axially outwardly of flange 26 and has a diameter greater than that of the major portion of sleeve 20 but smaller than that of flange 26. A groove 32 in the outer surface of step 30 receives an O-ring 34. A plurality of bosses 36 are provided adjacent step 30 about the circumference of the sleeve. In the embodiment described, three bosses equally spaced are provided about the sleeve. Referring to FIG. 3, adjacent the outer end of the sleeve, a plurality of circular apertures extend through the sleeve having three large apertures 38, three smaller apertures 39, and three smaller apertures 40, the apertures alternately equally spaced about the circumference of the sleeve.

A rotary seal member 42 is mounted on the inboard end of sleeve 20. The seal member 42 has a relatively wide seal portion 44 having an axially outwardly facing seal face 46. Seal member 42, on the seal portion 44 inner diameter, has a plurality of notches 48 engaging the bosses 36 on sleeve 20 and locking the rotary seal member 42 to sleeve 20 for rotation therewith. The outer diameter of rotary seal member 42 is slightly smaller than that of flange 26 of sleeve 20 and is spaced from the inner wall of the stuffing box 18. On the rear side of seal portion 44 opposite face 46, the inner diameter of rotary seal member 42 adjacent sleeve step 30 is increased, providing seal member 42 with a step 50 having an inner diameter approximately equal to the outer diameter of sleeve step 30. O-ring 34 in groove 32 of sleeve step 30 seals against the inner diameter of step 50 of rotary seal 42, such that step 50 is resiliently sealed to and spaced from step 30 thereby. The inner diameter of seal portion 44 of rotary seal member 42 is slightly greater than the local outer diameter of sleeve 20, such that bosses 36 can freely mate notches 48. The axially inwardly facing wall 52 of member 42, opposite seal face 46, is spaced from the end wall 31 of step 30 to permit fluid access therebetween, thus forming piston area A on wall 52. In an alternative embodiment, end wall 31 is employed as a reference surface in stead of wall 28 of flange 26, since it also is perpendicular to the shaft.

A stationary seal member 54 is provided axially outwardly of rotary seal member 42. Stationary seal member 54 includes a seal portion 56 extending from an inner diameter somewhat greater than the outer diameter of sleeve 20 to an outer diameter slightly smaller than the inner diameter of stuffing box 18. A narrow axially inwardly facing seal face 58 extends from the seal portion 56 toward and sealingly engages the seal face 46 of rotary seal member 42. Outwardly of seal portion 56 of stationary seal member 54, a secondary sealing portion 55 is defined by a step 60 at an outer diameter reduced relative to the outer diameter of sealing portion 56 and defining an axially outwardly facing wall 62 on the rear side of sealing portion 56 opposite seal face 58. As shown in FIG. 3, four equally spaced notches 64 extend radially through the outer end of step 60. In a particular embodiment, the stationary seal 54 is made of carbon and the rotary seal member 42 is made of silicon carbide.

A second stationary seal member 54' is provided outwardly of the first stationary seal member 54 in reverse orientation, i.e., with the seal face 58' facing axially outwardly. Stationary seal member 54' is identical to stationary seal member 54, and the corresponding portions thereof are designated with the same reference numerals differentiated by a prime designation. The ends of the stationary seal members 54, 54' opposite seal faces 58, 58' contact each other with notches 64, 64' aligned.

Similarly, outwardly of the second stationary seal member 54' a second rotary seal member 42', identical to rotary seal member 42 and reversely oriented relative thereto, is provided, with a seal face 46' contacting the seal face 58' of the second stationary seal member 54'. The portions of the second rotary seal member 42' are designated with the same reference numerals distinguished by a prime designation, as the corresponding portions of the first rotary seal member 42.

A lock ring 66 is mounted on sleeve 20 at the outer end thereof. Lock ring 66, as illustrated in FIGS. 2 and 3, has a radially enlarged outer end having threaded apertures 68 aligned with apertures 38 for receiving fasteners 69 locking the seal assembly to the shaft 12 for rotation therewith. The enlarged end of lock ring 66 also has threaded apertures 70 aligned with apertures 40 in sleeve 20 for receiving threaded fasteners 71 having cylindrical ends adapted to engage the edges of apertures 40 and axially locate the seal components prior to assembly in a pump. Three additional threaded apertures 72 aligned with apertures 39, equally spaced in the exterior of the lock ring, are provided to receive threaded fasteners 73 for securing centering clips 74 to the lock ring 66. A groove 76 is provided on the inner surface of the lock ring spaced inwardly from the sleeve apertures 38, 39, 40 and the lock ring apertures 68, 70, 72. An O-ring 78 is provided in groove 76 to prevent fluid from moving between the outer surface of the sleeve 20 and inner surface of the lock ring 66. The inner edge of lock ring 66 is provided with three axially extending protrusions 80 corresponding to the bosses 36 at the other end of the sleeve 20. Notches 48' in the second rotary seal member engage the protrusions 80 of the lock ring 66, locking the second rotary seal 42' thereto for rotation with the shaft 12 and sleeve 20. Between protrusions 80 and apertures 68, 70, 72 lock ring 66 has a step 82 having a diameter corresponding to and slightly reduced from the diameter of step 30 at the other end of the sleeve. Step 82 has a groove 84 receiving an O-ring 86 sealing against the step 50 at the inner diameter of second rotary seal member 42'. The inner diameter of second rotary seal member 42' at the seal portion 44' thereof is slightly larger than the outer diameter of the sleeve thereat. Wall 52' on the rear side of second rotary seal member 42' opposite seal face 46' is spaced from the end wall 31' of lock ring step 82 to permit access by fluid, thus forming piston area A' as shown in FIG. 2, equal to piston area A. A series of axial bores 87 about the inwardly facing wall of lock ring 66 provide pockets for springs 88 bearing against the outer end of the second rotary seal member 42'. Springs 88 bias all seal faces toward flange 26 at the inward or inboard end of sleeve 20.

A seal gland 90 is positioned generally centrally of the seal assembly. Gland 90, as shown in FIG. 1, has a plurality of slots 92 about the exterior thereof to receive mounting bolts 16 for mounting the gland and the seal assembly to the pump housing 14. As shown in FIG. 2, an annular groove 94 on the inner side of gland 90 receives a gasket 96 to prevent leakage of fluid between the pump housing and the gland. The inner diameter of the gland is provided with a pair of axially spaced grooves 98, 100 receiving O-rings 102, 104, respectively, overlying and sealing against the steps (or stepped walls) 60, 60' of stationary seal members 54, 54'. The axially inwardly facing end 99 of the gland is spaced from axially outwardly facing wall 62 of stationary seal member 54 to permit access by the process fluid, thus forming piston area B; and the axially outwardly facing wall 99' of the gland is spaced from axially inwardly facing wall 62' of stationary seal member 54' to permit access by the sealed environmental fluid (e.g., air), thus forming piston area B'.

Steps 60, 60' radially locate secondary sealing portions 55, 55' of stationary seal members 54, 54' at a smaller outer diameter than the inner diameter of gland 90, and O-rings 102, 104 are selected to resiliently sealingly accommodate this separation. This arrangement takes advantage of the resiliency of the O-rings and provides a means for sealingly maintaining the secondary seal between the gland and stationary members 54, 54' steps 60, 60' even when shaft 12 is not parallel to the central axis of the gland. Hence, as a result of this separation and the resiliency of O-rings 102, 104, stationary seal members 54, 54' can rock radially to accommodate shaft runout.

Shaft runout can arise from a stressed or warped shaft, for example, and will cause the rotary seal faces 46, 46', and indeed the entire rotary seal assembly 67, to be eccentric to the gland central axis. By enabling the stationary seal members to rock along with this rotary eccentricity, the respective seal face pairs 46, 58, 46', 58' remain in contact and parallel to each other as well as to wall 28 of flange 26 and perpendicular to the shaft. Thus the resilient mounting of the stationary seal members 54, 54' enables all of the adjustment to shaft runout to be isolated to the secondary seals at O-rings 102, 104, and isolated from the main sealing function at the seal faces of the rotary and stationary primary seal members.

As a result of the foregoing, seal face wear is reduced and the likelihood of oscillation-caused fatigue of the springs which can otherwise occur from continuously accommodating the rocking seal members is eliminated. As well, friction on O-ring 86 o sealing the outer rotor ring 42' to the sleeve is advantageously reduced.

Referring to FIGS. 2A, 2B, and 3, a lug 106 is placed in one of the aligned sets of notches 64, 64' of stationary seal members 54, 54' and extends into a recess 108 provided on the inner diameter of the gland, between grooves 98, 100. Lug 106 has a generally square base fitted in notches 64, 64' and a transverse cross bar 107 extending into recess 108 in gland 90 adjacent notches 64, 64'. As shown in FIG. 2A, cross bar 107 is spaced from the axially spaced end walls of recess 108, and as shown in FIG. 2B the width of the cross bar is reduced so that only one of its sides 107A or 107B contacts one of the sidewalls 108A or 108B of recess 108. Cross bar 107 and necessarily recess 108 are somewhat wider, circumferentially, than notches 64, 64' whereby lug 106 is retained in position when assembled. Lug 106 locks stationary seal members 54, 54' to gland 90 and secures these seal members against rotation while permitting axial excursions of the seal members 54, 54' without interference by the gland.

As well, gland axially facing walls 99, 99' are axially spaced at gaps 111, 111' from axially facing walls 62, 62' on the rear sides of sealing portions 56, 56' of the stationary seal members 54, 54'. This clearance further assures that shaft excursions in either axial direction can be accommodated without effecting mating of the seal faces.

Gland 90 is provided with a pair of radial ports 110, 112. These ports open into the interior of the gland between grooves 98, 100. Ports 110, 112 are provided as inlet and outlet ports for a barrier fluid which passes through those notches 64, 64' not containing lug 106.

The exterior surface of sleeve 20 aligned with notches 64, 64' and ports 110, 112 preferably is provided with a plurality of axially extending grooves 65 about its circumference. The grooves function as pumping vanes to assist in pumping barrier fluid from one port to the other.

As shown in FIG. 2, on the exterior of the seal about the inner periphery of gland 90 a groove 114 is provided to receive the radially outwardly projecting ends of the centering clips 74. The centering clips thus assure axial positioning of the gland and centering of the gland and the stationary seals during assembly.

Figure 4:
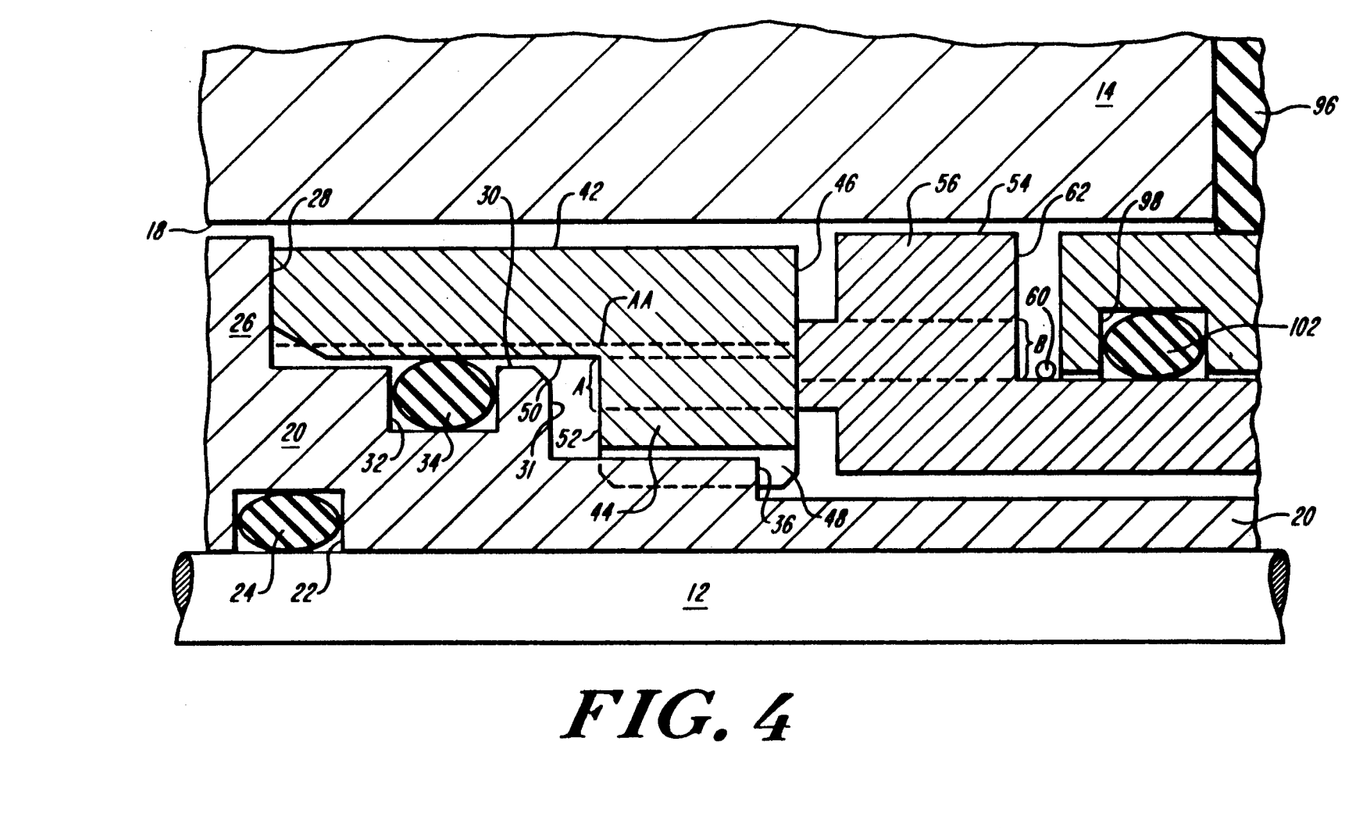
FIG. 4 is an enlarged fragmentary view of a portion of the sectional view of FIG. 2.

Referring to FIG. 4, the inboard first pair of primary seal members 42 and 54, defining the first pair of contacting seal faces 46, 58, are adapted to permit the barrier fluid to exert pressure on rear wall 52, opposite seal face 46, and the process fluid to exert pressure on rear wall 62, opposite seal face 58. By their construction, the rear walls 52, 62 define predetermined, fixed piston areas, piston area A and piston area B, respectively, transmitting net pressure from one of the fluids toward the first pair of sealing faces 46, 58. Each piston area is defined by the extent to which the associated wall 52, 62 overlaps the contact area of the seal faces 46, 58. Thus, in the case of rotary seal member 42, piston area A of wall 52 extends between the fixed inner diameter of stationary seal face 58 and the fixed diameter of wall 52 at step 50. Similarly, piston area B on wall 62 of stationary seal member 54 extends between the fixed outer diameter of stationary seal face 58 and the fixed diameter of wall 62 at step 60. In the illustrated embodiment, O-ring seals 34 and 102 where they seal against steps 50 and 60, respectively, define the limits of the piston areas relative to the inner and outer diameters of seal face 58 where they seal against steps 50 and 60, respectively. By proper radial location of the steps 50, 60, which receive seal rings 34, 102, the piston area in each direction (piston areas A and B) can readily be designed to achieve the desired percentage of the contact area of the seal faces 46, 58.

As illustrated in FIG. 4, it is possible to design different piston areas for the respective different fluid pressures for a given application. Thus, in one preferred embodiment, the piston area B portion of wall 62 of stationary seal member 54 may equal 70% of the contact area of the seal faces 46, 58, diagrammatically indicated by the tick marks at the faces, each mark representing 10% of the contact area, while piston area A, on wall 52 of rotary seal member 42, equals 60% of the contact area of the seal faces 46, 58. If the geometry of rotary seal member 42 were changed so that piston area A of wall 52 extended radially outwardly an additional 10% of the contact area of seal faces 46, 58 (i.e., to line AA), piston area A would then also equal 70% of the contact area and would be the same size as piston area B. In the illustrated embodiment, the spring load necessary to overcome O-ring friction on surfaces 50', 60 and 60' and to bias the seal faces is 40-50 psi, and the piston areas A and A' are each chosen to be 60% (rather than 70%) of the contact area of the contact faces 46, 58 and 46', 58' as will reduce the total closing force accordingly. Ideally, the piston areas are minimized to reduce friction and heat generation while still Providing a safety factor to prevent leakage of fluid across the relatively rotating seal faces. The piston areas must be selected to avoid any net force in the opposite direction tending to open the seal faces.

The piston areas are of fixed and predetermined size, independent of the thickness or location of the associated secondary seals. The seal face contact area associated with the piston areas is also independent of secondary seal thickness, and therefore can be quite small. The structure is double balanced in that the seal assembly will maintain a net hydraulic plus spring closing force across its inboard and outboard seals regardless of pressure fluctuations, or even upon reversal of the order (low to high or high to low) of the pressures being sealed.

The seal is assembled by placing O-ring 24 in groove 22 and O-ring 34 in groove 32. Rotary seal member 42 is then mounted on sleeve 20 with notches 48 engaging bosses 36 on the surface of the sleeve. O-rings 102, 104 are inserted in grooves 98, 100 of gland 90 and stationary seal member 54 is inserted into the gland with lug 106 in one notch 64 arranged with cross bar 107 in gland recess 108. Stationary seal member 54' is then inserted into the other end of the gland in abutting relation to the stationary seal member 54 with lug 106 extending into one notch 64'. O-rings 78, 86 are then placed in grooves 76, 84 of lock ring 66, and rotary seal member 42' is mounted on lock ring 66 against springs 88. Gland 90 is mounted about the sleeve 20 and the lock ring is positioned on the end of the sleeve 20. Threaded fasteners 71 are tightened in threaded apertures 70 of the lock ring and into the apertures 40 in the sleeve to axially locate the seal components and to define the pressure exerted by springs 88. Centering clips 74 are fastened into the lock ring by threaded fasteners 73 with their ends extending into groove 114 of gland 90. The centering clips axially locate the gland and center the gland and stationary seals pending the assembly in a pump housing.

To assemble the seal in a pump, the seal assembly is slid along the pump shaft with seals 42, 54 extending into the stuffing box 18 of the pump housing 14. Bolts 16 are then tightened in slots 92 of gland 90 to secure the seal to the pump housing with gasket 96 interposed between the gland and the housing. The seal assembly is then secured to the shaft 12 by threaded fasteners 69 extending through apertures 68 of the lock ring and 38 of the sleeve to lock against shaft 12. Centering clips 74 are then removed from the seal assembly.

In operation, sleeve 20 rotates with shaft 12 and carries with it rotary seal members 42, 42' as well as lock ring 66 and springs 88. Stationary seal members 54, 54' are held in a non-rotatably stationary position by lug 106 engaging notches 64, 64' and gland 90. Springs 88 bias both pairs of seal faces 46, 58 and 46', 58' together and toward flange 26 at the other end of sleeve 20. Process fluid moves between the outer diameter of seal members 42, 54 and the inner diameter of stuffing box 18. Relatively rotatable seal faces 46, 58 seal the process fluid at their stationary/rotary interface (i.e., at the aforesaid seal face contact area), and O-ring seal 102 seals process fluid from passing beyond non-rotatable seal member 54. Process fluid exerts a closing pressure force on seal faces 46, 58 as it exerts pressure on piston area B. Preferably, piston area B is equal to 70% of the contact area of the seal faces 46, 58. Barrier fluid entering through one of ports 110, 112 of gland 90 is sealed on the outer surface of stationary seals 54, 54' by O-rings 102, 104 in gland grooves 98, 100. Passing through notches 64, 64' to the outer surface of sleeve 20, the barrier fluid exerts pressure on rear walls 52, 52' of rotary seal members 42, 42' at piston areas A and A'. These piston areas are 70%, or in a preferred embodiment 60%, of the contact areas of the seal faces 46, 58 and 46', 58'. Piston area b' on wall 62' on the opposite side from seal faces 58' is radially defined by face 58' at its outer diameter and at step 60' at its inner diameter, and is acted upon at wall 62' by atmospheric or other external fluid pressure passing between the interior of the gland and the outer surface of seals 42', 54'.

Advantageously, the contact areas of the seal faces are not limited by O-ring size and can be designed to be as small as feasible to minimize heat generation. Piston areas A, A' of the rotary seal members 42, 42', where pressure from the barrier fluid is applied, can each be somewhat smaller than piston area B of stationary seal member 54, where pressure from the process fluid is applied to accommodate the sealed pressure difference. Thus the size of the piston areas can be adjusted independently of each other as needed. Of particular significance, such adjustment is made so that net forces closing the seal faces always are directed toward the flange at the end of the sleeve. The springs 88 provide an initial bias toward the flange, and with process fluid exerting force on wall 62 of stationary seal 54, process fluid pressure further biases the assembly toward the flange. As barrier fluid pressure is applied at piston areas A and A' inwardly from each end of the assembly with no net force in either direction, the spring force and any process fluid pressure at piston area B and the seal environment net pressure at B', if any, always produces a net force toward the flange.

Advantageously, the seals at faces 46, 58, 46' 58' are not effected by pressure fluctuations between process and barrier fluid. The springs and the pressures at piston areas B, B' supply a net closing force on the seal faces, regardless. Therefore such fluctuations do not cause shifting of the seal faces relative to O-rings 34, 102, and so there is no risk of "hang-up" of the O-rings which would unbalance the piston areas (if the piston areas were defined by the O-rings).

Advantageously, there is no axial motion of the seals relative to the springs; thus, constant spring pressure is applied regardless of axial excursions of the shaft. Any radial shaft misalignment has no effect on the springs since the springs bias the assembly against a squared end and the stationary seal members are resiliently mounted and can adjust accordingly with respect to the sleeve, and thus no spring flexure is required if such radial misalignment should occur. Specifically, if the shaft is not square to the stuffing box, the stationary members 54, 54' will rock accordingly relative to gland 90 while they and the rotory seal members 42, 42' remain squared to each other, flange 26, and shaft 12. Because the springs are located outside of the pump and gland, they are not subject to corrosion or contamination from either the process or barrier fluids. Additionally, seal face wear can be judged by observing the length of the springs.

Advantageously, there is no axial motion of the seals relative to the springs; thus, as the sleeve moves with the shaft, constant spring pressure is applied regardless of axial excursions of the shaft.

Notwithstanding the foregoing features and advantages, pumping efficiency of vanes 65 at inlet and outlet ports 110, 112 will diminish as axial excursion of the shaft shifts the vanes away from the fixedly located ports. Therefore, in an alternative preferred embodiment shown in FIGS. 5-6, an annular flow ring 120 is provided which defines a flow path or channel 121. Ring 120 optimizes delivery of vane-accelerated barrier fluid flowing through ports 110, 112 along the surface of sleeve 20 and to and from the mated seal faces 46, 58, 46', 58' to be cooled therewith regardless of shaft excursions.

Figure 5:
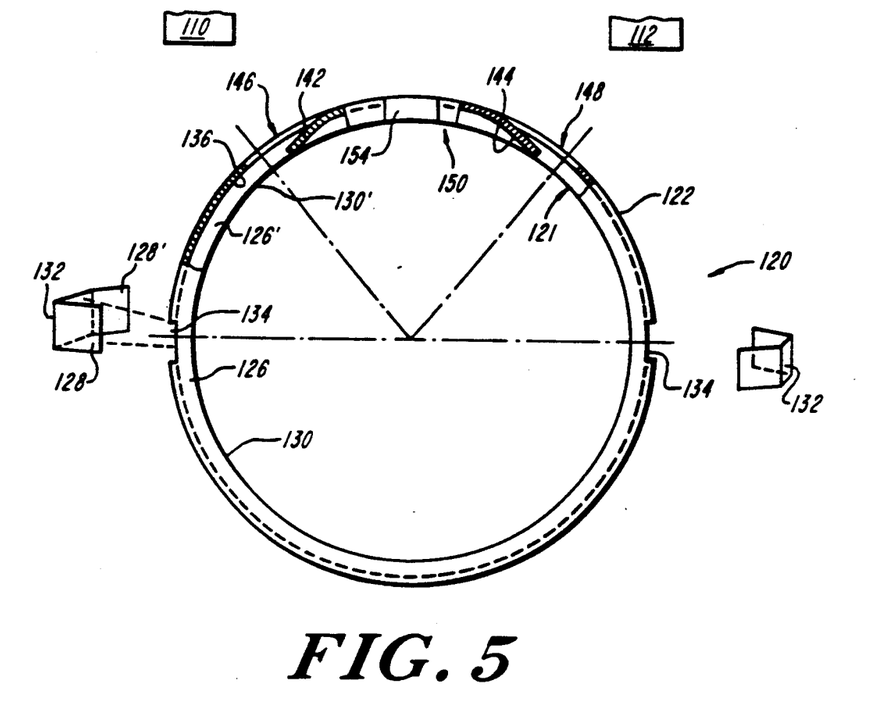
FIG. 5 is a side view of a flow ring of the invention.
Figure 5A:
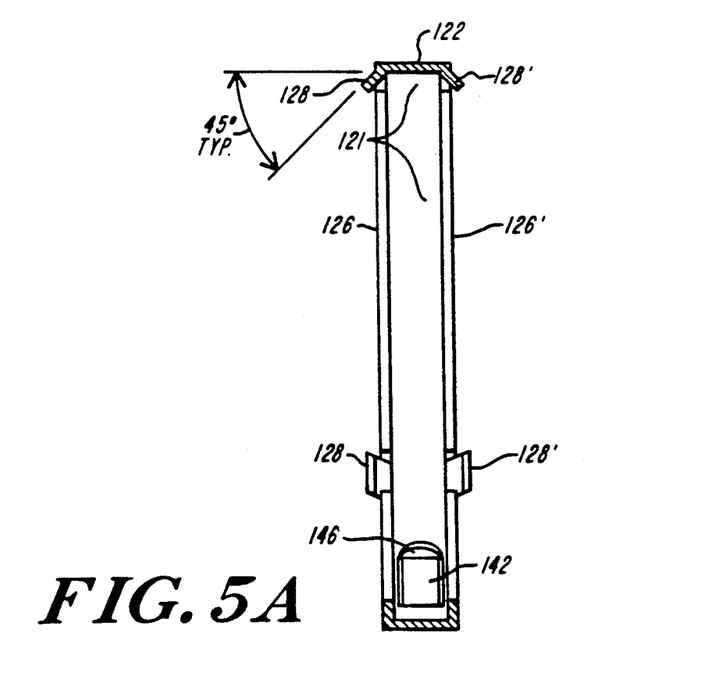
FIG. 5A is a cross-sectional view of an alterative embodiment of the ring of FIG. 5.
Figure 5B:
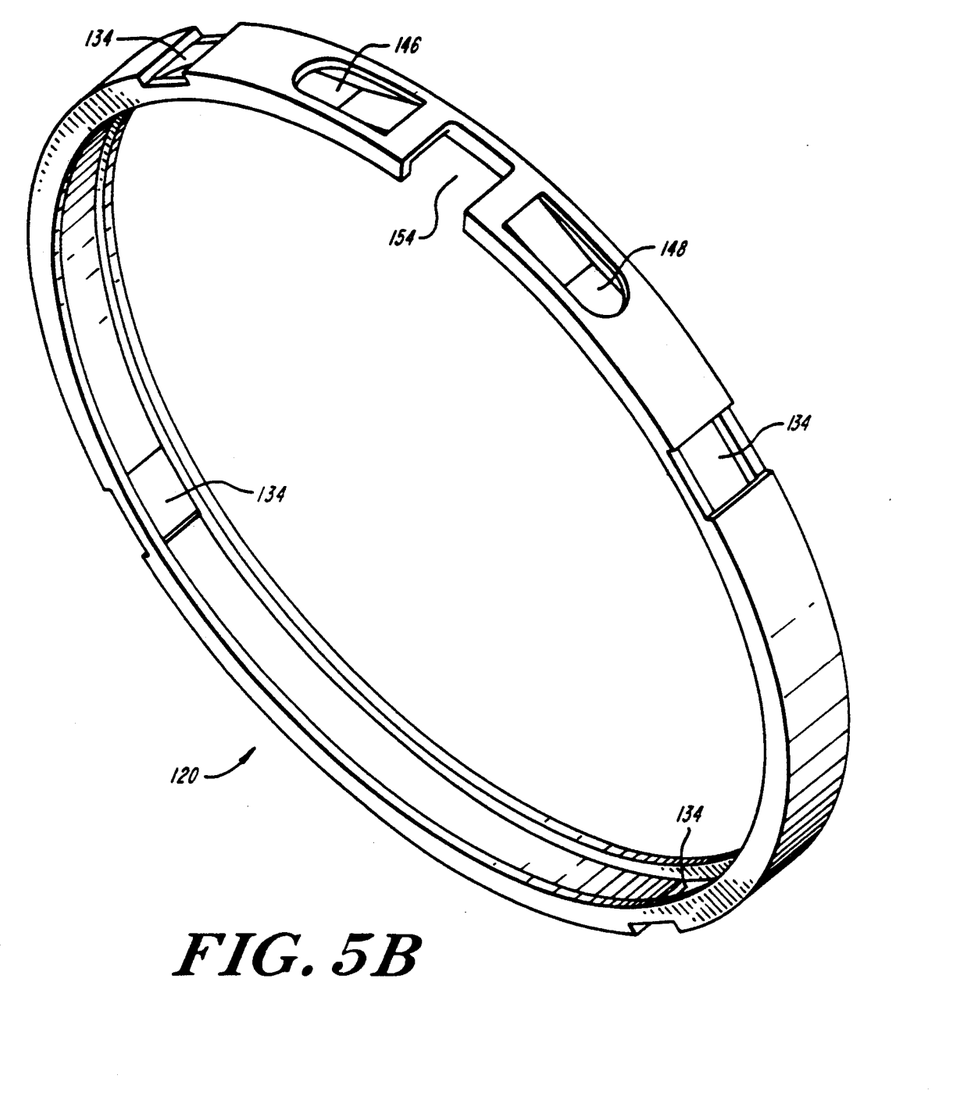
FIG. 5B is a perspective view of the ring of FIG. 5.
Figure 5C:
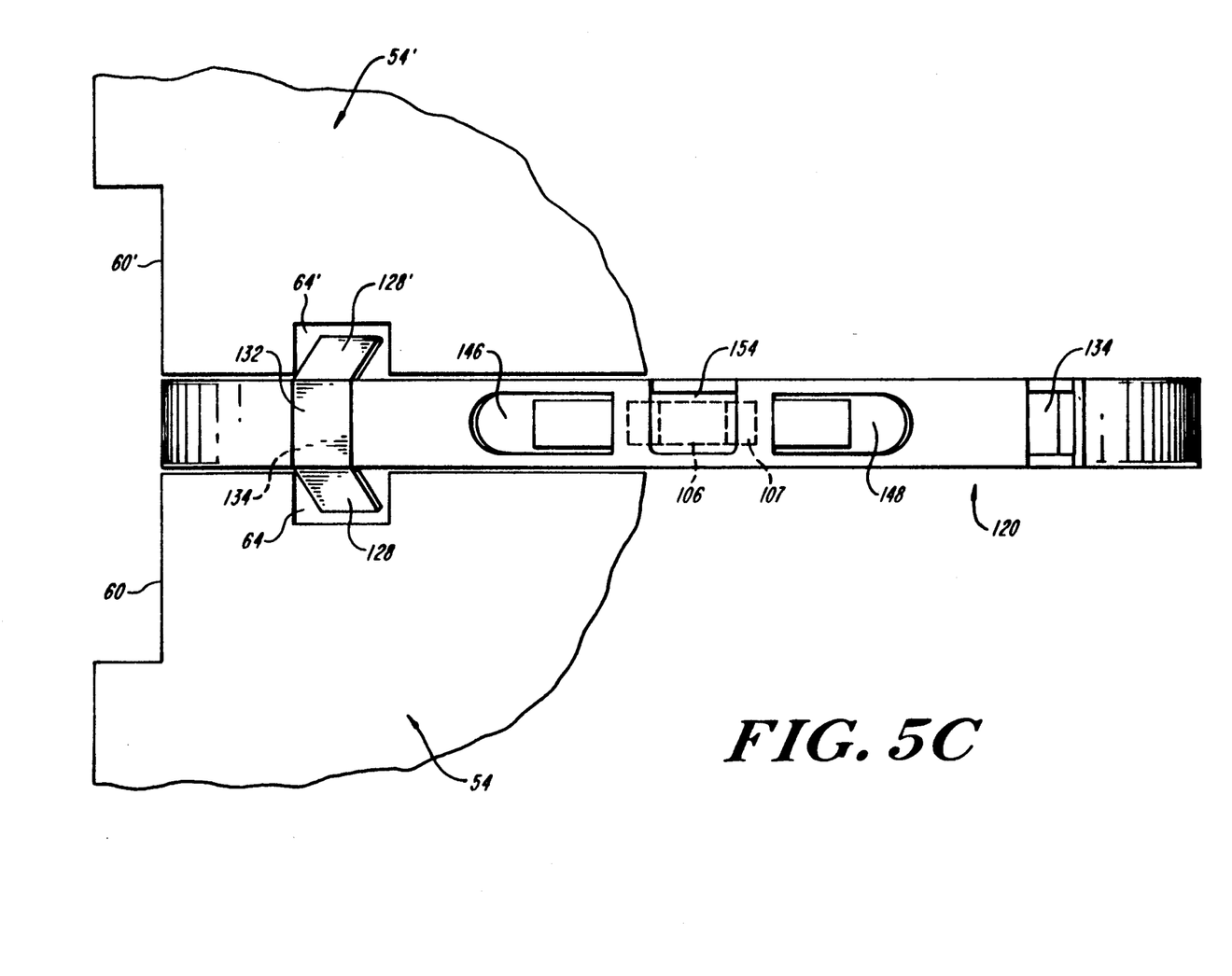
FIG. 5C is a top view of the ring of FIG. 6.
Figure 6:
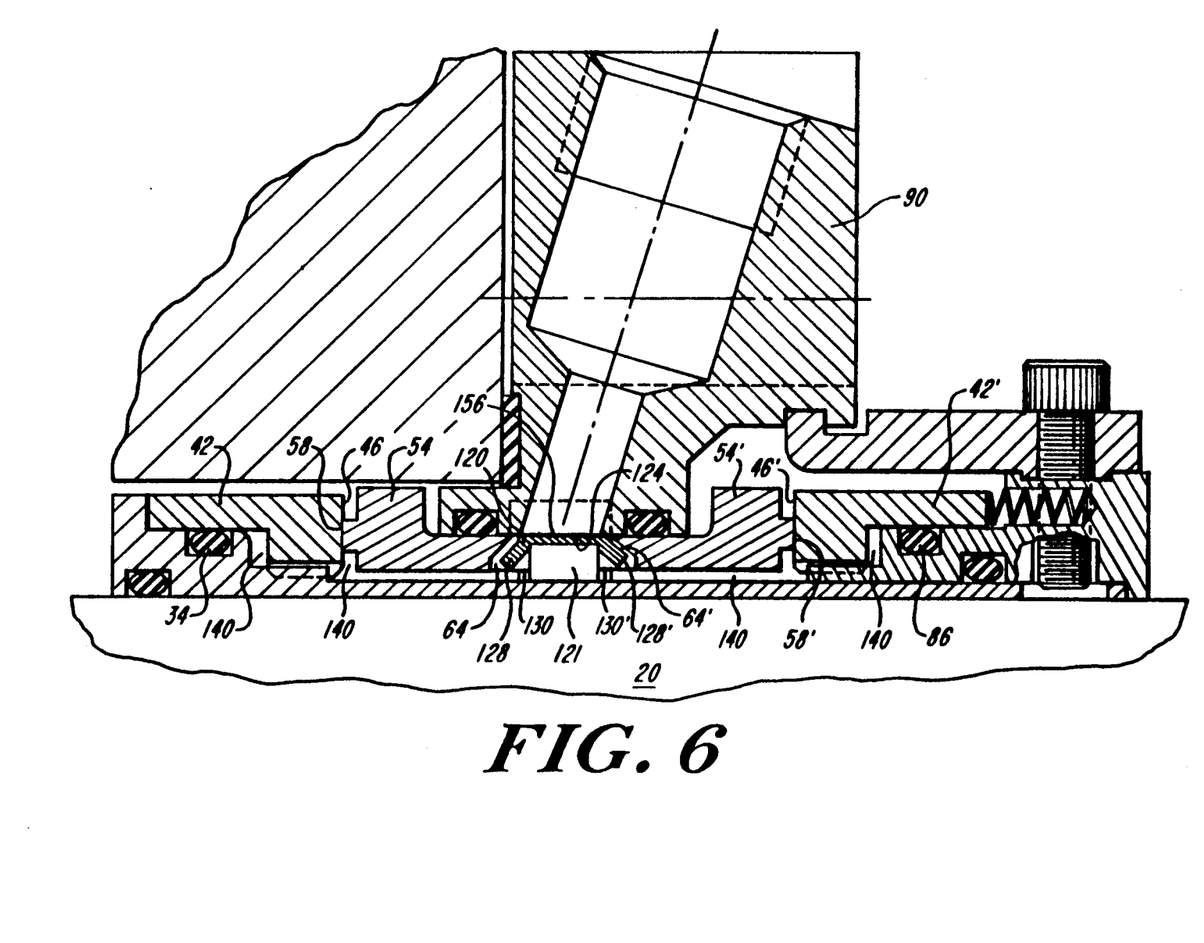
FIG. 6 is a sectional view of an alternative embodiment of the invention of FIG. 2 with ring 120 installed.

As will be appreciated from the drawings, one embodiment of ring 120 is shown in side view in FIG. 5 and an alternative embodiment of ring 120 is shown in FIG. 5A. FIG. 5B shows ring 120 of FIG. 5 in perspective view before attachment of the anti-rotation strips 132 in slots 134, and provides an additional view of slot 154 (the latter for receiving anti-rotation lug 106) and passages 146, 148. FIG. 5C is a top view of ring 120 of FIG. 5 with one of the strips 132 attached, and showing a practical view of stationaries 54, 54'. As shown, flanges 128, 128' of strip 132 cooperate with anti-rotation notches 64, 64' of stationaries 54, 54' to prevent rotation of the ring relative to the stationaries, and anti-rotation lug 106 (shown in dotted outline) mates in slot 154 to lock the ring to the gland (via lug crossbar 107) to prevent rotation of the ring relative to the gland. FIG. 6 shows an alternative embodiment of the assembly of FIG. 2 with ring 120 installed.

Annular ring 120 is nonrotatably mounted on the gland concentrically to the shaft. In particular, the ring has an outer circumferential surface 122 at an outer diameter slightly less than the inner diameter of the adjacent interior surface 124 of gland 90 receiving the ring thereat. The ring has radial sidewalls 126, 126', each of which is provided with an axially outwardly extending flange or boss 128, 128'. In this embodiment, the ends of primary seal members 54, 54' include at least one of the aforesaid notches 64, 64', and these notched ends abut a respective one of sidewalls 126, 126' with a respective notch 64, 64' mated with a respective flange 128, 128' for non-rotatably mating the seal members to the gland via the ring. The ring sidewalls 126, 126' extend radially inwardly toward the shaft sleeve to the ring's radially inner surface 130, 130' at a diameter preferably only slightly greater than the local outer diameter of the shaft sleeve thereat.

Flanges 128, 128' may be constructed in various manners. For example, in the embodiment of FIG. 5, flanges 128, 128' are formed by applying strip 132 to circumferential slot 134 on the outer surface 122 of ring 120 having flanges 128, 128' angled at 45° from surface 122. In the embodiment of FIG. 5A, the 45° flanges are stamped out of sidewalls 126, 126'.

Ring 120 further defines an interior circumferential surface 136 extending axially between the interiors of sidewalls 126, 126', thus forming the internal flow channel 121 which cooperates with the vane-bearing local sleeve surface thereat. The flow channel serves for efficient conveyance of barrier fluid from and to ports 110, 112 and throughout the barrier-fluid receiving areas 140 within the seal, i.e., between the sleeve outer surface and the inner surfaces of all of seal members 42, 54, 42', 54' up to O-rings 34, 86.

Ring 120 is further provided with radially inwardly deflected flanges 142, 144 extending through ring outer and inner surfaces 122 and 136. The inwardly deflected flanges define a dam 150 therebetween within flow channel 121. The dam obstructs fluid flow thereat, while fluid flow is unobstructed in the remaining portion of the flow channel. In the process of forming the flanges, a pair of radial passages 146, 148 are formed radially penetrating the ring circumference adjacent to flanges 142, 144, respectively.

The unobstructed portion of the flow channel Provides a barrier-fluid flow path running between passages 146, 148, while the flanges direct fluid flow to and from passages 146, 148 into or out of the flow channel. Passages 146, 148 mate with the mouths of ports 110, 112 of the gland for transfer of barrier fluid therebetween, and form either an inlet or outlet depending on the direction of shaft rotation. In operation, at the inlet passage, the associated flange directs fluid flow inwardly between the rotating vane-bearing shaft sleeve and the unobstructed flow channel and at the outlet passage the associated flange directs the accelerated fluid outwardly out of the flow channel to the adjacent outlet port. As a result of this arrangement, the equipment shaft may be rotated either clockwise or counter clockwise with optimized barrier fluid delivery in either case.

The gland of this embodiment is like that shown in FIG. 1 except that ports 110, 112 are relocated corresponding to location of passages 146 and 148. For example, as shown in FIG. 5, passages 146 and 148 subtend an acute angle of about 40 degrees, enclosing dam 150 therebetween, and ports 110, 112 are located accordingly.

A portion of ring 120 at dam 150 defines a circumferential slot 154 opening radially outwardly from the ring circumference for receipt of lug 106 for rotationally locking the ring to the gland. This then non-rotatably locks primary sealing members 54, 54' to the gland via the ring, and also assures alignment of the inlet and outlet passages of the flow channel with respective mouths of the inlet and outlet ports of the seal.

The respective seal Ports couple with the respective ring passages to provide fluid delivery essentially tangentially to the shaft central axis, so as to minimize turbulence on fluid transfer at the flow channel. Preferably the cross-section of each of the port mouths (e.g., mouth 156 of port 110 shown in FIG. 6) is greater than the cross-section of the passage 146 or 148 associated therewith so that a fluid flow path can be maintained regardless of misalignment therebetween occasioned by axial shifting of the ring relative to the gland.

In operation, as the sleeve and vanes 65 on the sleeve shift axially, the seal members 42, 54, 42', 54' shift with ring 120 floating axially between seal members 54, 54'. This arrangement maintains the flow channel centered over the pumping vanes so as to optimize delivery of the cooling barrier fluid to the axially shifted seal surfaces regardless of shaft endplay. Ideally, the ring cooperates with the shaft sleeve and gland with such dimensions and tolerances to permit the ring to shift with the gland-mounted stationary seal members 54, 54' for accommodating both endplay and runout of the rotating shaft.

Other embodiments of this invention which will occur to those skilled in the art are within the scope of the following claims. For example, it would be possible to employ a single stationary seal having two seal faces in conjunction with a split gland.

What is claimed is:

1. A double mechanical seal assembly having a gland for fixed attachment to the housing of equipment having a rotary shaft means, the shaft means comprising a shaft which is subject to endplay and fluid-flow acceleration vanes associated with said shaft, said gland having an interior surface for non-rotatably receiving a pair of annular primary seal members having seal faces which mate with a respective seal face of a second pair of annular primary seal members which are non-rotatably mounted to said shaft means, said primary seal members forming two pairs of mated seal faces defining a sealed barrier-fluid environment, a first pair of said mated seal faces sealing process fluid along said shaft means in a process-fluid environment, said gland having a pair of ports extending radially therethrough and each port having a mouth located for opening into said barrier-fluid environment adjacent to said vanes for providing barrier-fluid flow thereat in the direction of rotation of said shaft means when said gland is mounted to said equipment concentrically to said shaft, the seal comprising an axially floating, annular flow ring having an outer circumferential surface for mounting to said gland interior adjacent to said port mouths and axially between said primary seal members associated with said gland, the interior of said floating ring comprising an obstructed flow channel, said floating ring having sidewalls extending radially inwardly to the inner diameter of said floating ring, said flow channel defined along an inner circumferential surface of said floating ring axially located between said sidewalls, said floating ring further comprising a pair of passages extending radially through said outer and inner circumferential surfaces, said ring interior further including a dam located between said passages, said dam blocking fluid flow between said passages in a first rotational direction in said flow channel, said passages floatingly communicating with ones of said gland port mouths to facilitate flow of barrier fluid through said ports, passages, and flow channel, in a second rotational direction, and mounting means for non-rotatably mounting said floating ring and said primary seal members associated with said gland to said gland, said mounting means permitting axial travel of said gland-mounted primary members and said floating ring to accommodate axial shifting of said shaft means while sealing barrier fluid flow in said barrier-fluid environment, whereby said axial travel of said floating ring maintains said flow channel located adjacent to said vanes regardless of shaft endplay while said mated seal faces remain mated.

2. The seal assembly of claim 1 wherein each said sidewall comprises a lock structure, wherein each one of said first pair of primary seal members has an axial seal face at one end thereof and said means for non-rotatable mounting comprises the other end of each of said first pair of primary seal members, each said other end comprising at least one key structure, each said sidewall lock structure cooperating with said at least one key structure for non-rotatably locking said first pair of primary seal members to said flow ring.

3. The seal assembly of claim 2 wherein said sidewall lock structure comprises a flange and said at least one key structure comprises a notch.

4. The seal assembly of claim 1 wherein said means for non-rotatably mounting further comprises a recess defined in said gland and a recess defined in said outer circumferential surface of said floating ring and a lug for mating in said recesses and for locking said floating ring against rotation in said gland but facilitating axial shifting of said ring.

5. The seal assembly of claim 1 wherein said means for non-rotatably mounting comprises a resilient secondary seal for mounting one said primary seal member associated with said gland resiliently to said gland.

6. The seal assembly of claim 4 wherein said means for non-rotatably mounting includes a first O-ring mounted between, and separating from physical contact, said gland interior and a local sealing surface of one said primary seal member associated with said gland, and a second O-ring mounted between and separating from physical contact, said gland interior and a local sealing surface of the other of said primary seal members associated with said gland.

7. The seal assembly of claim 1 wherein said floating ring further comprises a pair of flanges deformed radially inwardly from said outer and inner circumferential surfaces and creating said pair of passages extending radially through said outer and inner circumferential surfaces.

8. The seal assembly of claim 7 wherein said flanges are deformed radially inwardly to said inner diameter of said floating ring.

9. The seal assembly of claim 1 wherein said equipment housing comprises a central annulus defining a stuffing box and through which said shaft means extends, wherein said shaft has a central axis and the housing has a central axis, said axes being aligned, wherein said central axes are subject to misalignment with each other, and wherein said means for non-rotatably mounting comprises means for isolating misalignment between the central axis of said shaft and the central axis of said stuffing box from said seal faces, for maintaining said seal faces essentially perpendicular to said shaft regardless of any such misalignment.

10. The seal assembly of claim 9 wherein said means for isolating comprises a sleeve assembly for mounting on said shaft, said assembly including a sleeve with a flange at one end and spring means on the other end thereof, for maintaining uniform spring load across all seal faces regardless of any said misalignment thereof, said vanes formed on an outer surface of said sleeve.

11. The seal assembly of claim 10 wherein one of said primary seal members is axially resiliently mounted on said sleeve, said primary seal members being mounted under uniform compression from said spring means and transmitting said compression from said spring means through said floating ring to said flange.

12. The seal assembly of claim 11 wherein said spring means comprises compression springs located circumferentially about one end of said sleeve assembly concentrically to said shaft, said means for isolating comprising isolating structure for preventing flexure of said springs regardless of any said misalignment.

13. The seal assembly of claim 12 wherein said springs are located outside of said equipment and of said gland and are isolated by one of said pairs of seal faces from said process-fluid and from said barrier-fluid environments.

14. The seal assembly of claim 13 wherein said primary seal members each define generally radially extending piston areas on the non-seal face rear sides thereof, the piston areas radially aligned with and smaller than the contact area of the seal faces, and each piston area being a predetermined fixed area equal to a major portion of the contact area.

15. The seal assembly of claim 14 wherein said means for non-rotatably mounting comprises a resilient secondary seal for mounting one said primary seal member associated with said gland resiliently to said gland, further comprising a resilient secondary seal for mounting one said primary seal member associated with said sleeve slidably to said sleeve, said resilient secondary seals being located on the rear sides of said primary seal members at fixed positions spaced axially from said seal faces to prevent passage of fluid axially along said primary seal members.

16. A flow ring for use in a mechanical seal assembly having a first primary seal member associated with a stationary structure of equipment to be sealed and a second primary seal member associated with the shaft of the equipment, and having a barrier fluid chamber defined between the first primary seal member and second structure mounted concentrically to the shaft, the seal members defining relatively rotatable mating seal faces which define a contact area therebetween for sealing a process fluid within said equipment, the seal assembly including a gland for stationary mounting to said equipment concentrically to said shaft, said gland defining a central annulus for receipt of said shaft and further defining fluid ports opening out through the gland interior for flowing of barrier fluid in said seal assembly to cool said primary seal members, said gland interior receiving said first primary seal member for mounting in said seal assembly, said flow ring comprising an axially floating, annular ring having an outer circumferential surface for mounting to the interior of said gland adjacent to said ports and axially adjacent the end of said primary seal member associated with said gland, said ring having a lock means for being non-rotatably locked to said gland, said ring having an interior circumferential surface comprising an obstructed flow channel for flowing of barrier fluid in said seal assembly.

17. The ring of claim 16 further comprising a pair of passages extending radially through said outer and inner circumferential surfaces, said ring interior further including a dam located between said passages, said dam blocking fluid flow between said passages in a first rotational direction in said flow channel, said passages floatingly communicating with said gland ports to facilitate flow of barrier fluid through said ports, passages and flow channel in a second rotational direction.

18. The ring of claim 17 wherein said shaft comprises vanes associated therewith for acceleration of barrier fluid flowing through said ports by rotation of said shaft, said ring further comprising mounting means for non-rotatably mounting said floating ring and said primary seal member associated with said gland to said gland, said mounting means permitting axial travel of said gland-mounted primary member and said floating ring to accommodate axial shifting of said shaft, whereby said axial travel of said floating ring maintains said flow channel located adjacent to said vanes regardless of shaft endplay while said mated seal faces remain mated.

19. The ring of claim 18 wherein said floating ring has sidewalls extending radially inwardly to define the inner diameter of said floating ring, said flow channel defined along said inner circumferential surface of said floating ring axially located between said sidewalls.

20. The ring of claim 19 wherein each said sidewall comprises a lock structure, wherein said first primary seal member has an axial seal face at one end thereof and said means for non-rotatable mounting comprises the other end of said primary seal member, said other end comprising at least one key structure, one said sidewall lock structure cooperating with said at least one key structure for non-rotatably locking said primary seal member to said flow ring.

21. The ring of claim 20 wherein said sidewall lock structure comprises a flange and said at least one key structure comprises a notch.

22. The ring of claim 21 wherein said means for non-rotatably mounting further comprises a recess defined in said outer circumferential surface of said floating ring and a lug for mating in said recess and in said gland for locking said floating ring against rotation in said gland but facilitating axial shifting of said ring.

23. The ring of claim 1 or 17 wherein said pair of passages extend radially through said outer and inner circumferential surfaces to subtend an acute angle therebetween for cooperation with gland ports subtending a like angle.

24. The ring of claim 1 or 17 wherein said pair of passages extend radially through said outer and inner circumferential surfaces to subtend an angle of about 40 degrees therebetween for cooperation with gland ports subtending a like angle.

25. A method for improving the flow of barrier fluid within a mechanical seal assembly, the seal assembly of the type having a first primary seal member associated with a stationary structure of equipment to be sealed and a second primary seal member associated with the shaft of the equipment, and having a barrier fluid chamber defined between the first primary seal member and a second structure mounted concentrically to the shaft, the seal members defining relatively rotatable mating seal faces which define a contact area therebetween for sealing a process fluid within said equipment, the seal assembly including a gland for stationary mounting to said equipment concentrically to said shaft, said gland defining a central annulus for receipt of said shaft and further defining fluid ports opening out through the gland interior for flowing of barrier fluid in said seal assembly to cool said primary seal members, said gland interior receiving said first primary seal member for mounting in said seal assembly, said method comprising the steps of provide an axially floating, annular flow ring having an outer circumferential surface for mounting to the interior of said gland adjacent to said parts and axially adjacent the end of said primary seal member associated with said gland, providing said ring with a lock means for being non-rotatably mounted to said gland, and providing said ring with an interior circumferential obstructed flow channel for flowing of barrier fluid in said seal assembly.

* * * * *